Patented June 14, 1927.

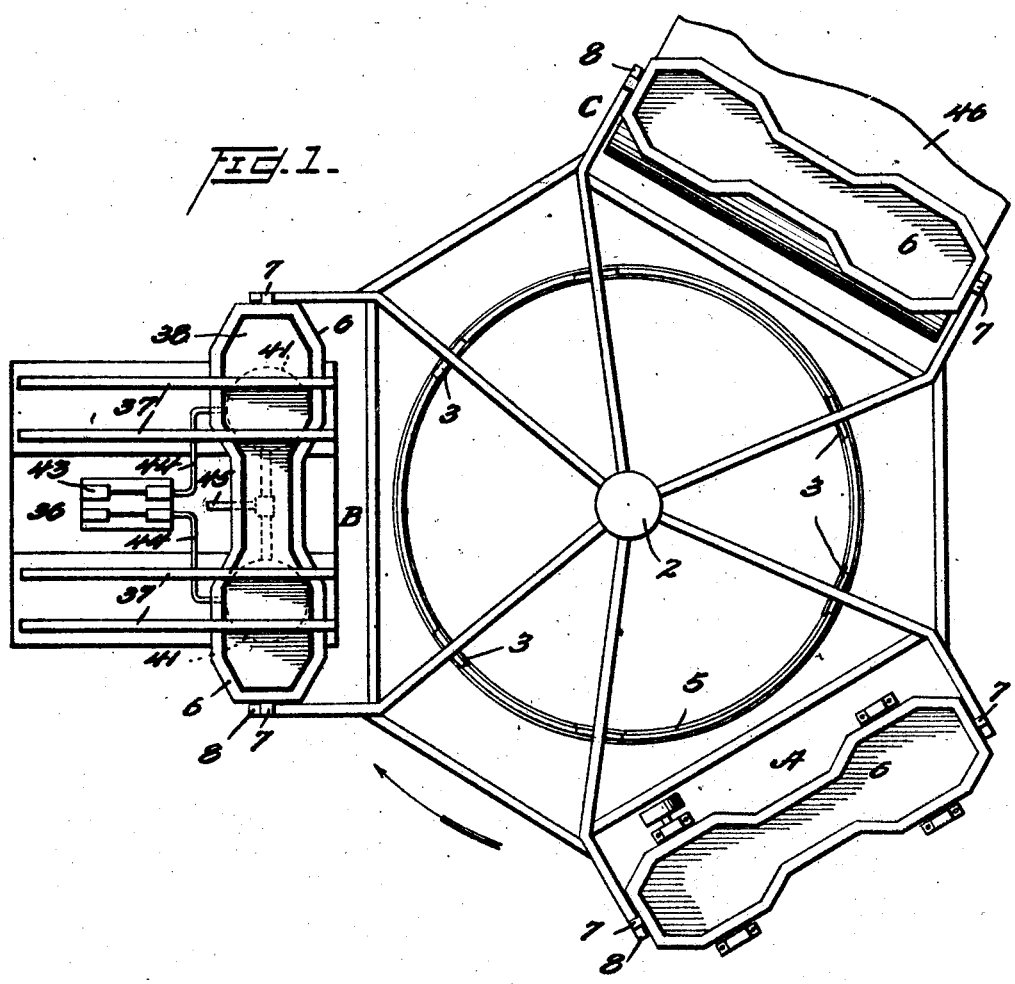

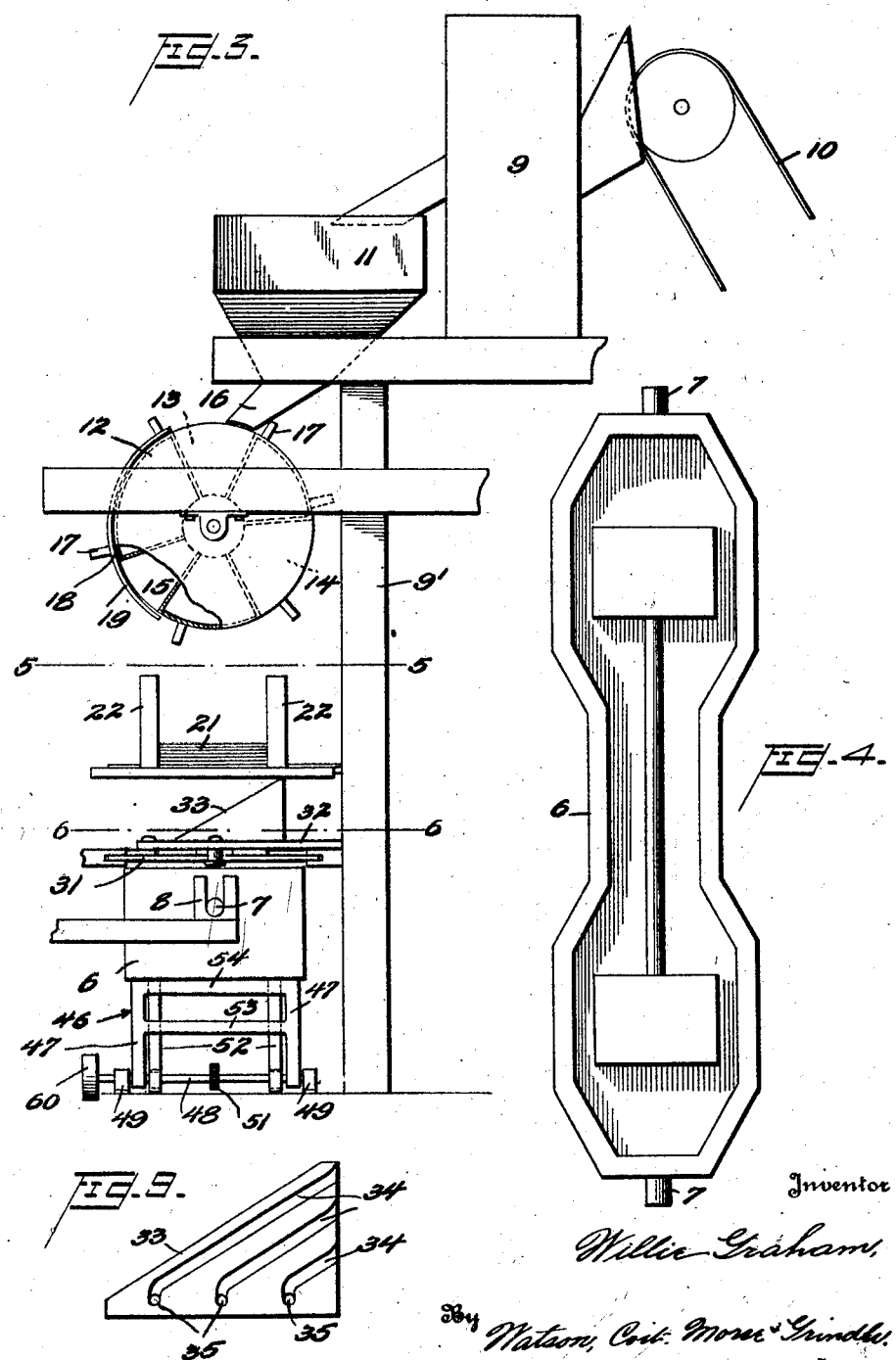

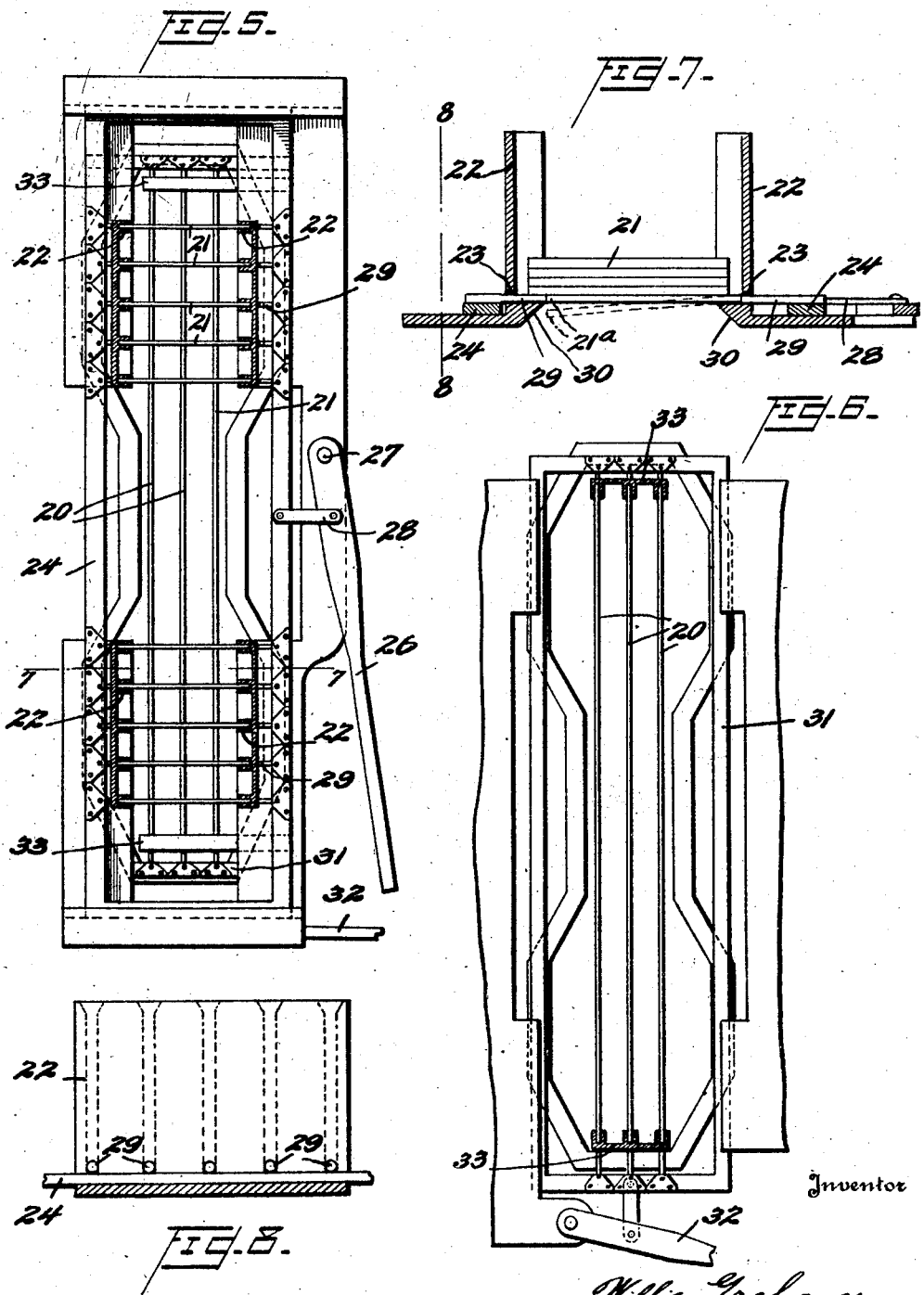

1,632,286

UNITED STATES PATENT OFFICE.

WILLIE GRAHAM, OF HOUSTON, TEXAS.

CONCRETE-MOLDING MACHINE.

Application filed December 10, 1923. Serial No. 679,767.

This invention relates to mechanism intended and adapted to make, by molding under pressure, all types of practically useful articles composed of concrete or analogous materials which are of such size as to be easily portable. It is furthermore intended and adapted to provide a device of the class indicated combining few parts, of simple construction and low cost, in which the operative elements are of such construction and so compactly and conveniently arranged and operatively connected that the successive operations necessary, beginning with the mixing of the concrete to the deposit of the finished article, may be performed quickly, easily and with great accuracy producing a uniform product.

Broadly and briefly stated a device embodying my present invention comprises in combination the following structural features: an elevated horizontal rotary support analogous to the well known turn table having a plurality of mold supporting arms extending outwardly therefrom arranged in pairs, equally spaced around said supports the two arms of each pair being parallel and having an aligned open top bearing sockets near their outer ends, the center line of the sockets of each pair being tangent to a circle having the center of rotation of said support as its center; an open top mold of any desired form and size between the arms of each pair, having aligned trunnions projecting from its ends on a central line above the center of gravity of the mold with its trunnions resting in the open top bearing sockets; an elevated concrete mixer and an elevated hopper which receives the mixed concrete from the mixer, means for regulating and controlling the amount of material discharged from said hopper, in such a position as to be directly over each mold at one part of its movement with the rotary support, a vibrator mechanism adapted to vibrate the mold while it is being filled with concrete, a rigidly supported die at a suitable distance peripherally from said hopper having a downwardly facing mold surface in substantially a horizontal plane slightly above the plane of the upper edges of the mold wall the said die having a marginal form corresponding to that of the interior of the mold and of such size as to be adapted to enter the open top of the mold snugly fitting the inner surfaces of its walls, the said die being so located that each mold will be immediately below it at one point of its movement with the rotary support; means under said die and normally below the horizontal plane of the bottoms of the molds for vertically moving a mold which has been filled and is stationary and in vertical alignment with said die whereby the upward movement of the mold will cause the die to enter its open top and compress the material in it; a suitable conveyor for receiving and transporting the finished article so located as to be directly beneath each mold at a point in its movement with the rotary support whereby the finished articles in the mold may be deposited in succession on said conveyor by turning the molds on their supporting trunnions when they are above said conveyor.

In the preferred form of my invention shown there are three molds in such relative positions on the rotary support that one will be under the discharge outlet from the hopper, the second will be under the compressing die and the third will be over the conveyor at the same time whereby one mold may be filled while the material in another is being compressed and the finished article in the third is being deposited on the conveyor for removal to a suitable location for drying. This feature of my invention has the great advantage of making it possible to mold a substantially uniform article very rapidly, thus materially lowering the cost of production.

Although the structural arrangement described above is well adapted to rapidly mold concrete articles of various shapes and sizes, some articles or products composed of concrete require reinforcing bars or rods embodied in them in proper positions in order to render them strong enough to stand tensile and bending stresses incident to their use, such as concrete railroad ties, and my invention includes as a very important advantageous feature, means for receiving and holding such reinforcing devices properly arranged just above the open top of the mold when it is in position below the discharge opening from the hopper and for releasing them when the depth of the material in the mold reaches certain predetermined planes in which it is desired that the rods shall be in the finished article. The deposit of a set of bars or rods takes place in the short interval between the deposit of the proper amount of concrete to form a layer in the mold of the desired thickness and the deposit of another layer of concrete in the mold. This arrangement has the great advantage of placing all the reinforcing devices with mathematical accuracy in the correct positions in each article made without reducing to any extent, the speed at which the articles were formed.

It is evident from what has been said above that a structural combination embodying my invention may be successfully used in making practically all molded articles composed of concrete or analogous material whether large or small, and whether they include reinforcing means or not, such as blocks for paving or building, tiles, railroad ties, fence posts, mile posts, supports for crossing signs, piling and sheet piling. All that is necessary to adapt it to make any particular article is to form the mold and die of a desired size and design, to regulate and control the amount of material discharged into the mold from the hopper in accordance with the requirements of the particular article, and to so arrange the supports for the reinforcing bars or rods that they will be in the required position in the finished article.

The novel features of my invention and their advantages will be more fully understood from the following description and claims taken with the accompanying drawing. The particular embodiment of the invention shown and described hereinafter is adapted to make concrete railroad ties such as described and claimed in my copending application Ser. No. 668,743 filed Oct. 15, 1923.

In the drawings:

Fig. 1 is a plan view of a device embodying my invention, the concrete mixing and delivering mechanism being omitted;

Fig. 2 is an elevation of the device as shown in Figure 1, certain parts being in section;

Fig. 3 is an elevation of the concrete mixer, aggregate measuring device and reinforcing rod supporting mechanism showing a mold in position after filling;

Fig. 4 is a plan view from above of one type of mold adapted to be used in the machine;

Fig. 5 is a plan view from above taken on line 5—5 of Figure 3;

Fig. 6 is a plan view from above taken on line 6—6 of Figure 3;

Fig. 7 is a transverse section taken on line 7—7 of Figure 5;

Fig. 8 is a section on line 8—8 of Figure 7;

Fig. 9 is a face view of one of the retaining members for the long reinforcing bars.

As shown in Figures 1 and 2 the device includes a rotary support adapted to be manually rotated about a supporting and centering post or spindle 2 mounted in a bearing socket set in a suitable base, preferably of concrete, and wheels 3 mounted in downwardly extending brackets 4 fastened to the arms of the rotary support, and a circular track 5 on which said wheels run and prevent tipping of the rotary support. The rotary support is arranged to pivotally mount a plurality, preferably three, of molds 6. These molds are open at the top, are of rigid construction, and are each supported by a pair of parallel arms extending outwardly from the rotary support and having open top bearing sockets 8. The molds 6 are each provided with trunnions 7 adapted to fit within the bearing sockets.

As shown in Figure 4, each of the molds is preferably formed of cast metal having a substantially flat bottom and substantially vertical sides with enough incline to allow for the ready withdrawal of the molded tie. The central portion of the mold is narrow and the ends are elongated octagons. The necessary projections extend upward from the bottom to form pockets in the completed tie for the reception of cushion blocks and an elevated member between these projections provides a groove in the top of the tie to receive a rail spacing bar. The configuration of the mold is such as to form a completed tie as described in my copending application above noted.

In completely forming a molded article the rotary support makes one full revolution, the mold 6 stopping three times, once in each position A, B and C, as shown in Figure 1. In position A it is supplied with a predetermined quantity of concrete and if desired with the necessary reinforcing bars. In position B a die is rigidly supported above the mold and the mold elevated by a suitable mechanism to compress the concrete therein. In position C the mold is directly above a travelling conveyor and may be rotated manually on its trunnions to allow the finished article to drop out and be removed.

Figure 3 shows a mold in the position A where it is adapted to be filled with concrete from the elevated concrete mixer 9 supported on suitable posts 9'. The mixer 9 may be supplied with raw materials by any known means here shown as a conventional conveyor 10. The mixer is adapted to discharge into a hopper 11 supported on cross members mounted on the posts 9'. This hopper is provided with an open ended spout 16 fitting against the outer surface of a cylinder 12 pivotally mounted for rotation about its axis on horizontal supports suitably fastened to the posts 9'. The spout 16 and the cylinder 12 are the same length as the interior dimensions of a mold and the cylinder is adapted to act as a measuring gate to supply concrete at desired intervals and of desired quantity to the mold. For this purpose it is divided into suitable sized compartments by means of radial partitions. The outer covering 18 of this cylinder is removed or cut away between certain of these radial partitions thereby forming segmental-shaped compartments such as 13, 14 and 15 which will fill with concrete as they are successively brought beneath the spout 16. The cylinder is provided with handles 17 for manual rotation. Supported from the transverse members on which the cylinder is pivoted is an arcuate shield 19 tightly fitting against the cylinder to prevent concrete from falling out of the compartment during counter clockwise rotation of the cylinder until the compartments are above the mold. It will thus be seen that this cylinder acts as a measuring gate, the compartments 13, 14 and 15 each holding a sufficient quantity of cement to deliver a layer of the desired thickness into the mold as the same is rotated. If desired reinforcing members can then be placed on this layer and a second layer of concreate placed in the mold by further rotation in the cylinder. In the particular example shown three compartments have been shown in the cylinder but it is to be understood any suitable number may be used depending upon the number of sets of reinforcing bars desired in the finished article.

Between the mold and the cylinder 12 is arranged mechanism for holding and releasing when desired reinforcing bars. The specific tie shown is reinforced in two directions; by longitudinal bars 20 and two sets of transverse bars 21, one set in each enlarged end of the die. The bars 21 are adapted to be held in vertical alignment one above the other by a pair of opposed racks each comprising a plate provided with suitable channels 22 between which are grooves closed at the bottom in which the opposite ends of the bars 21 are supported. Adjacent the bottom of each groove there is a hole 23 through the racks slightly larger in diameter than the bars 21. The racks are each adapted to hold a number of bars 21 and means is provided to simultaneously release one bar from each groove, said means comprising a rectangular frame 24 horizontally mounted on slides suitably supported from the posts 9'. This frame is adapted to be moved in a direction parallel to the bars 21 by means of lever 26 pivoted to a stationary support at 27 and connected to the frame by a link 28. Opposite each one of the holes 23 in the racks the frame is provided with a pin 29 rigidly secured thereto at one end and coaxial with the bars 21. Upon movement of the frame from a neutral position toward an adjacent rack by operation of the lever 26 the pins on one side of the frame enter the holes 23 and longitudinally move all of the lower bars in the grooves of the racks in the manner shown in Figure 7 where the end 21ª of a bar 21 is shown released from its groove bottom at one end, which has fallen slightly due to its weight. Upon movement of the lever in the opposite direction the pins on the other side of the frame come into play to move the bars 21 in the opposite direction. The ends 21ª being below the tips of the inclined surfaces 30 of the rack bottoms causes these ends to be guided downward and as the pins 23 finally push the opposite ends of the bars from the racks, the complete set of bars fall into the mold substantially horizontally. The mechanism for releasing the longitudinal reinforcing bars 20 is quite similar in structure and operation to that above described. However, the frame 31 carrying the releasing pins is adapted for longitudinal movement by means of the hand lever 32. The frame 31 is arranged below the frame 24 and consequently the racks for supporting the longitudinal bars can only receive one bar in each channel since they would interfere with the dropping of the lateral bars. Hence the longitudinal bars must be supplied by placing them one set at a time in the channels in the racks. To accomplish this they are fed by hand into the channels 34 of the racks 33 which are provided with holes 35 similar to, and for the same purpose as, those 23 in the racks in the lateral reinforcing bars. By having the channels 34 inclined as shown in Fig. 9 the bars can be fed in from the side of the device and are then adapted to be dropped as a set.

In filling a mold the cylinder 12 is first rotated by means of the handles 17 to release from the proper compartment 13, 14 or 15 sufficient concrete to fill up the mold to the level at which it is desired to have the first set of reinforcing bars in the finished article. These bars are then released by successive operation of the levers 32 and 26 and dropped into proper position on the surface of the concrete. The cylinder 12 is again partially rotated, placing the next layer of concrete in the mold, another set of reinforcing bars are then dropped and the operation is continued until the mold is filled. The compartments in the cylinder are properly proportioned to place the desired amount of concrete below, above and between the various sets of reinforcing bars. It is to be understood that the concrete is poured between the bars as they are in position to be dropped.

While filling the mold with concrete I have discovered that it is of great advantage to shake or vibrate the mold so as to settle the concrete and eliminate any air pockets or spaces that would be detrimental to the finished article, seriously weakening it. In order to provide this vibration I have arranged the vibrator mechanism 46 as shown in Figs. 2 and 3. It comprises a pair of U-shaped frames 47 each mounted for partial rotation about a shaft 48 journaled in bearings 49 secured to the base of the machine. The shafts 48 are connected together by a chain 50 operating on sprockets 51 and are driven from a suitable source of power by means of the pulley 60 on one of the shafts. Slidably mounted in each U-shaped frame is a pair of bumper rods 52 loosely guided by the cross member 53 and the top 54 of the frame. The lower end of each rod is enlarged to fit over an eccentric 55 driven by the shaft 48. When the frames 47 are rotated about the shaft 48 to a vertical position they slightly elevate the mold above them to lift its trunnions from the frame and allow it to rest upon frames 47. The bumper rods 52 are of such a length as to project beyond the upper end of the frames 47 during about one-half of their stroke under the action of the eccentric 55. When power is applied to the drive pulley 60 it will be seen that the bumper rods will simultaneously elevate the mold above the tops of the frame 47 and will then suddenly allow it to drop onto the tops of these frames, the sudden stopping serving to settle the concrete and better compact it. In order that the frame 47 may be gotten out of the way while the turn table is being rotated, means are provided for folding them inward toward each other, such means comprising the pair of links 56 each having one end pivoted to a frame. The inner ends of the links are pivoted together and to a downwardly projecting link 58, which may be operated in any suitable manner (not shown) such as a foot pedal to draw the frames together and thus lower them sufficiently to allow the molds to pass over them. An upward thrust upon the link 58 will serve to bring them into a vertical position and at the same time slightly raise the molds to rest on their upper ends.

When the mold is filled with the desired amount of concrete the support is rotated sufficiently to bring the mold to the position B where the compressing means is located and the concrete put under pressure by the press 36.

The articles adapted to be made by this machine are formed in an inverted position, that is, the bottom of the mold is of the proper configuration to give the desired shape to the top of the article. To compress the material in the mold and overhanging facing die 38 is rigidly supported by standard 37 with its lower face in the plane slightly above the horizontal plane of the upper edges of the mold. This die is of such outline and size as to fit snugly within and contact with the side walls of the mold and has its lower face of the proper configuration to give the upper surface of the concrete in the mold the shape desired on the bottom of the finished article. When the mold is rotated beneath the die it is stopped with its vertical marginal lines in alignment with the corresponding lines of the outer vertical surface of the die by a spring latch 39 supported from the standards 37.

Any suitable means may be used to lift the mold and compress the concrete between the mold and die. I have however shown a hydraulic press suitable for this purpose. It comprises a base 40 integral with the standards 37 and mounting the hydraulic cylinders 41 containing suitable pistons 42 having large flat heads projecting above the ends of the cylinders and slightly below the horizontal plane of the bottom of a mold. These pistons are adapted to be simultaneously projected by hydraulic pressure supplied by the pumps 43 through the pipes 44 fitted with suitable control valves not shown. Exhaust pipe 45 connected to the cylinder allows the fluid to be exhausted from the cylinders at will so that the pistons will return to their normal position by gravity. When the pistons are projected the heads come in contact with the bottom of the mold which is then elevated so that the die enters and fits within its upper portion compressing the material in the mold. This upward movement of the mold is permitted by the trunnions 7 moving upward in the open top sockets 8 of the mold support. The pressure applied to the material in the mold should be sufficient to produce a comparatively solid mass in which the particles adhere sufficiently to make the article strong enough to stand the ordinary strains of handling without cracking even before the cement has set. When the pressure is released from the cylinders the pistons return to normal position under the weight of the mold. The rotatable support can then be rotated until the mold reaches the position C.

In this position the mold is above a travelling belt conveyor 46 of any convenient type. The mold may now be manually rotated 180° on its trunnions and the molded article will fall out by gravity on to the conveyor and be removed by it to a suitable place for drying. It will be noted that the article is now in its correct position bottom down.

It will of course be understood that any suitable number of molds may be mounted on the rotatable support and that the several operations enumerated above may be carried on simultaneously thus increasing the speed of production. If greater speed is desired in a single machine, the rotatable support may for instance be supplied with six molds, two concrete mixers with their appurtenances, two pressing devices and one or two conveyors, as desired. Thus the speed of the machine can be doubled.

I desire it to be understood that my invention is not limited to the specific details of structure shown but to be broadly construed except as limited by the appended claims.

Having thus described the invention what is claimed as new and desired to be secured by Letters Patent is:

1. A molding device, comprising in combination, an elevated container for moldable material provided with means for regulating the discharge thereof, means for compressing said material in molds, a conveyor adapted to receive compressed articles, and means for moving a series of pivotally mounted molds into cooperative relation successively with said container, said compressing means and said conveyor and means to invert said molds successively to release their compressed contents on to said conveyor.

2. A molding device comprising in combination a rotary support, a plurality of molds supported thereby, means for filling said molds in succession and means for depositing reinforcing members on the material in said molds during the filling operation.

3. A molding device comprising in combination a series of molds, means for moving said molds successively, under an elevated filling mechanism comprising a container, a multiple measuring discharge gate for said container and means for holding, in proper position above said molds, and simultaneously releasing, a plurality of reinforcing members.

4. A molding device comprising an open top mold, a container for moldable material, a multiple compartment measuring gate adapted to discharge directly into said mold and means for releasably supporting a series of reinforcing members between said mold and said gate.

5. In a molding machine the combination of an open top mold, a container for material to be molded, means for discharging a predetermined amount of material into said mold at each operation, and means for releasably supporting a plurality of reinforcing members above said mold and in the path of the material discharged into the mold.

6. In a molding machine the combination of an open top mold, means for filling said mold, a support for a plurality of reinforcing members adapted to hold them in predetermined fixed positions between said mold and said filling means, and means for simultaneously releasing a set of said reinforcing members.

7. In a molding device, means for depositing reinforcing bars in open top molds, comprising in combination, two pairs of supports for the bars, one pair at the sides of the mold for lateral bars, and the other pair at the ends of the mold for longitudinal bars, each pair having vertical surfaces facing each other with corresponding grooves or channels for the ends of the bars and down which they may move by gravity, the lower ends of the channels being closed, and means for simultaneously and successively releasing a set of bars carried by a pair of supports.

8. In a molding device, means for depositing reinforcing bars in open top molds comprising in combination a pair of supports for the bars arranged at the ends of the mold, and having vertical surfaces facing each other with corresponding grooves or channels for the ends of the bars and down which they may move by gravity, the lower ends of the channels being closed, and means for simultaneously releasing the bottom set of bars from the supports.

9. In a device of the class described a support for bars comprising a pair of opposed vertical channel members for the ends of the bars each channel having a closed lower end, and the said channel members having holes straight through at the lower ends of said channels, and means for moving the bars longitudinally successively in both directions to release them from the support.

10. In a device of the class described means for supporting horizontally a plurality of bars in a vertical stack, and a pin coaxial with and adjacent each end of the lowest bar for releasing it from the support.

11. In a bar holding and releasing device, means for horizontally supporting, one above another, a plurality of bars at their ends, and reciprocable means moving lengthwise of the bars for releasing the lowest bar.

12. A molding device comprising in combination a rotary support having at its outer margin a plurality of bearing sockets in the arc of a circle having the center of rotation as its center, the sockets being in pairs equally spaced around the support and the sockets of each pair being in alignment, an open top mold, having aligned trunnions at its end on a center line slightly above the center of gravity, resting in the two sockets of each pair, the sockets being so formed as to permit a limited upward movement of the trunnions, an elevated container having a discharge outlet and means for controlling the amount of material discharged at each operation, in such position that each mold at one point in its movement with the support will be immediately below it, means for compressing the material in the mold including a stationary die slightly above a horizontal plane through the upper portion of the mold adapted to fit in the mold and a vertically movable power actuated member slightly below the horizontal plane of the bottoms of the molds, this means being in such position that each mold after being filled will be between the die and the vertically movable member at one point in its movement, and a conveyor in such position that it will be below each mold at one point in its movement after the material in it has been compressed.

13. A molding device comprising in combination a rotary support having at its outer margin a plurality of bearing sockets in the arc of a circle having the center of rotation as its center, the sockets being in pairs equally spaced around the support and the sockets of each pair being in alignment, an open top mold, having aligned trunnions at its ends on a center line slightly above the center of gravity, resting in the two sockets of each pair, the sockets being so formed as to permit a limited upward movement of the trunnions, an elevated container having a discharge outlet and means for controlling the amount of material discharged at each operation, in such position that each mold at one point in its movement with the support will be immediately below it, means for compressing the material in the mold including a stationary die slightly above a horizontal plane through the upper plane of the mold adapted to fit in the mold and a vertically movable power actuated member slightly below the horizontal plane of the bottoms of the molds, this means being in such position that each mold after being filled will be between the die and the vertically movable member at one point in its movement, and a conveyor in such position that it will be below each mold at one point, the relative arrangement of the operative parts above noted being such that one mold may be filled, the material in another may be compressed and a compressed article in a third mold may be discharged onto the conveyor and arranged for drying simultaneously.

14. A molding device comprising in combination a rotary support having at its outer margin a plurality of bearing sockets in the arc of a circle having the center of rotation as its center, the sockets being in pairs equally spaced around the support and the sockets of each pair being in alignment, an open top mold, having aligned trunnions at its ends on a center line slightly above the center of gravity, resting in the two sockets of each pair, the sockets being so formed as to permit a limited upward movement of the trunnions, an elevated container having a discharge outlet and means for controlling the amount of material discharged at each operation, in such position that each mold at one point in its movement with the support will be immediately below it, means for releasably supporting a predetermined number and arrangement of reinforcing bars in horizontal position below the discharge outlet of said container and in the path of the material entering the mold below it, means for compressing the material in the mold including a stationary die slightly above a horizontal plane through the upper portion of the mold adapted to fit in the mold and a vertically movable power actuated member slightly below the horizontal plane of the bottoms of the molds, this means being in such position that each mold after being filled will be between the die and the vertically movable member at one point in its movement, and a conveyor in such position that it will be below each mold at one point in its movement after the material in it has been compressed.

15. A molding device comprising in combination, an elevated container for material to be molded, means for discharging the predetermined amount of material desired for a particular step in the operation, means for moving open top molds to and from a position in which they will receive and discharge and means for releasably supporting a predetermined number of reinforcing bars arranged above said mold and in the path of the discharge that they will be in the desired relative positions in the finished article.

16. A molding device comprising in combination, an elevated container for material to be molded, means for discharging the predetermined amount of material desired for a particular step in the operation, means for moving open top molds to and from a position in which they will receive and discharge, means for releasably supporting a predetermined number of reinforcing bars so arranged above said mold and in the path of the discharge that they will be in the desired relative positions in the finished article, and means for simultaneously releasing all of the bars in a set.

17. A molding device comprising in combination, an elevated container for material to be molded, means for discharging the predetermined amount of material desired for a particular step in the operation, means for moving open top molds to and from a position in which they will receive and discharge, means for releasable supporting at their ends a set of parallel bars just above the mold extending longitudinally thereof, means for supporting a set of parallel reinforcing rods in horizontal position and at right angles to and above said first mentioned rods, means for separately and successively releasing said set of bars.

18. A molding device comprising in combination, an elevated container for material to be molded, means for discharging the predetermined amount of material desired for a particular step in the operation, means for moving open top molds to and from a position in which they will receive and discharge, means for releasably supporting at their ends a set of parallel bars just above the mold extending longitudinally thereof, means for supporting a plurality of sets of parallel reinforcing bars in horizontal position above and at right angles to said first set of bars, the corresponding bars of said sets resting on those of the set below and means for simultaneously releasing all of the bars in the lower set.

19. A molding device comprising in combination, means for supporting and moving on predetermined horizontal lines a series of open top molds filled with suitable material, means for compressing the material in said molds including a fixed die slightly above the plane of the upper edges of the mold adapted to fit the interior of the mold and in such relative position that the mold will, at one point in its movement, be directly below it with its lateral surfaces in vertical alignment with the inner vertical surfaces of the mold, and vertically movable power actuated means directly under said die but normally slightly below the horizontal plane of the bottoms of the molds for moving said mold upward thus causing the die to compress the material in said mold.

20. A molding device comprising in combination, means for supporting and moving on predetermined horizontal lines, a series of open top molds filled with suitable material, means for compressing the materials in said molds including a fixed die slightly above the plane of the upper edges of the mold adapted to fit the interior of the mold and in such relative position that the mold will, at one point in its movement, be directly below it with its lateral surfaces in vertical alignment with the inner vertical surfaces of the mold, and vertically movable power actuated means directly under said die but normally slightly below the horizontal plane of the bottoms of the molds for moving said mold upward thus causing the die to compress the material in said mold, automatic means for arresting the movement of each mold as it reaches its position in alignment with the die.

21. A molding device comprising in combination, means for supporting and moving on predetermined horizontal lines a series of open top molds filled with suitable material, means for compressing the material in said molds including a fixed die slightly above the plane of the upper edges of the mold adapted to fit the interior of the mold and in such relative position that the mold will at one point in its movement, be directly below it with its lateral surfaces in vertical alignment with the inner vertical surfaces of the mold, and vertically movable power actuated means directly under said die but normally slightly below the horizontal plane of the bottoms of the molds for moving said mold upward thus causing the die to compress the material in said mold, the said molds being pivotally supported in a central line above their centers of gravity whereby they may be rotated and discharge the compressed article.

22. A molding device, comprising in combination, a rotary support, a plurality of molds pivotally supported thereby, means for filling said molds, means for vibrating said molds while filling, and means for compressing the material in said molds.

23. A molding device, comprising in combination, a series of molds, means for moving said molds successively beneath an elevated filling mechanism and above a vibrating mechanism including a pair of pivoted frames, bumper rods carried thereby, means for reciprocating said bumper rods, and means whereby said frames may slightly lift a mold while said mold is being filled.

In testimony whereof I hereunto affix my signature.

WILLIE GRAHAM.